Sept. 6, 1960 M. HUGENTOBLER 2,951,431
PERCOLATOR ON COFFEE MACHINES
Filed April 24, 1958 2 Sheets-Sheet 1
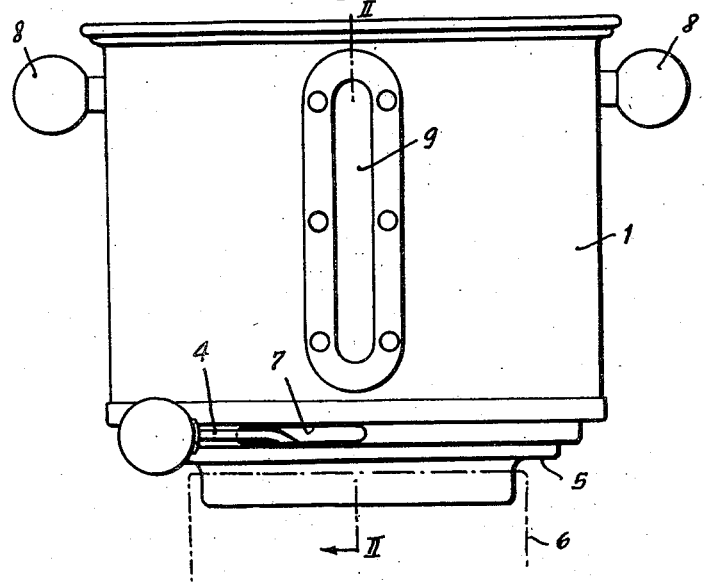
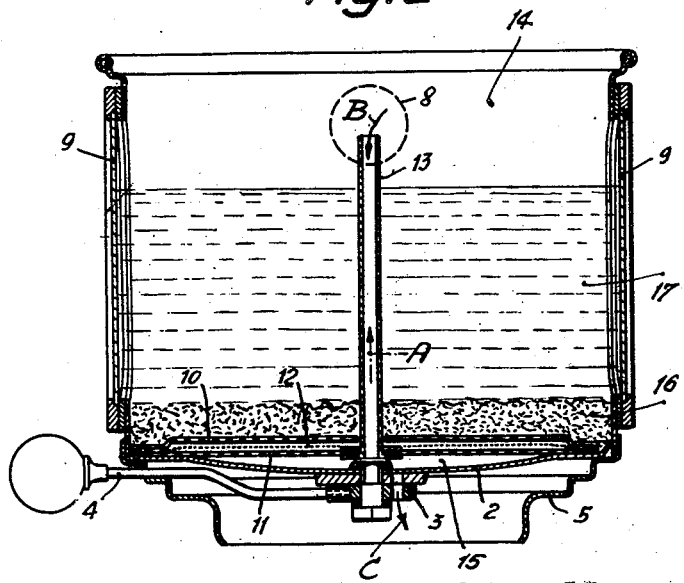
INVENTOR
Max Hugentobler
BY Lowry + Rinehart
ATTORNEYS Sept. 6, 1960 M. HUGENTOBLER 2,951,431
PERCOLATOR ON COFFEE MACHINES
Filed April 24, 1958 2 Sheets-Sheet 2
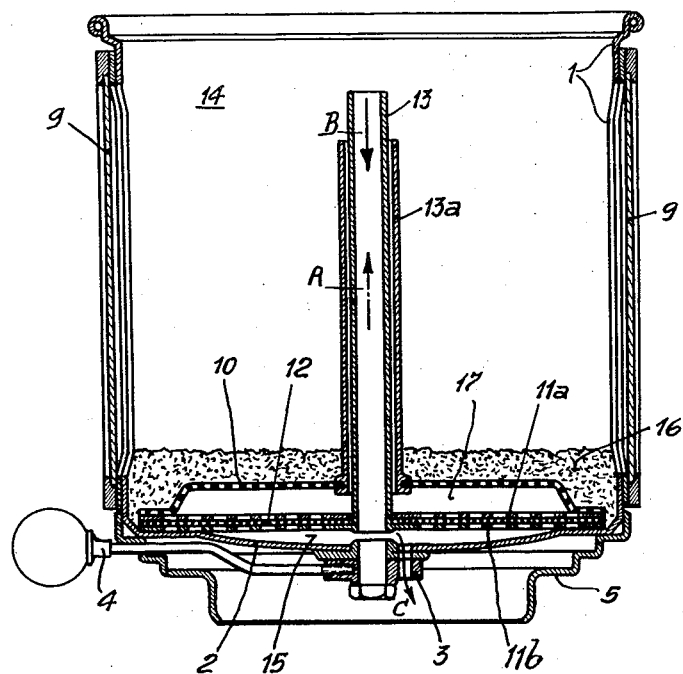
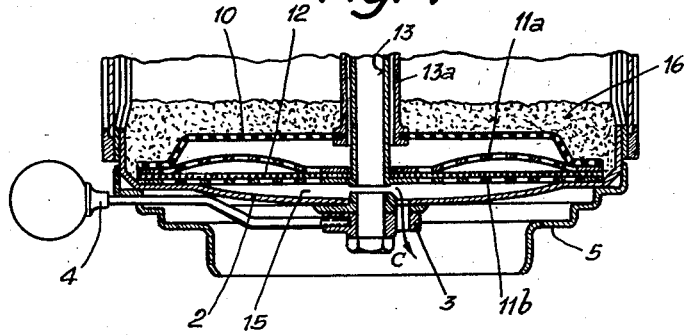
INVENTOR
Max Hugentobler
BY Lowry + Rinehart
ATTORNEYS

United States Patent Office 2,951,431
Patented Sept. 6, 1960

2,951,431

PERCOLATOR ON COFFEE MACHINES

Max Hugentobler, Schwellistrasse 31–33, Zurich, Switzerland

Filed Apr. 24, 1958, Ser. No. 730,635

1 Claim. (Cl. 99—299)

There are known coffee machines in which the percolator receiving the ground coffee is provided with a filter strainer bottom and arranged on a vessel receiving the coffee filtrate. Such machines have the drawback that air cushions obstructing the flow are formed at the bottom below the ground coffee or the strainer with filter insert, owing to the lack of venting facilities.

Also, steam evolved by the boiling water is prevented from reaching the ground coffee and acting on the latter to produce a good flavor. It is known that the water may remain in contact with the ground coffee for a short time only, if a first-class flavor is to be obtained.

This invention relates to a percolator on coffee machines. Under the present invention, the vessel space above the filter is connected to the vessel space below the filter by means of a pressure-equalizing tube.

Embodiments of this invention are shown by way of examples in the attached drawing, in which Fig. 1 is a partial front view, with the filtrate drain valve closed, Fig. 2 is a vertical section along line II—II in Fig. 1, with the filtrate drain valve opened, in a first embodiment, Fig. 3 is a vertical section through a second embodiment, and Fig. 4 is a vertical section through a variant of the strainer.

In Figs. 1 and 2, the percolator provided for coffee machines presents a vessel 1 designed to receive the ground coffee and in the concave bottom 2 of which the known filtrate drain valve 3 is fitted. The valve is operated by the lever 4. Located at the bottom of the vessel 1 is a stepped ring 5 as a seat for placing on the lower vessel 6. The stepped ring presents a slot 7 for the passage of the operating lever 4 and by which the opening and closing path of the valve 3 is limited. Further components are the handles 8 of the vessel 1 and the sight glasses 9 of the vessel 1, these sight glasses permitting to check the level of the boiling water. Resting on the concave vessel bottom 2 is a double strainer including bottom plates 10, 11 with a filter paper disk 12 interlaid between the two plates. Fitted in the centre of the double strainer bottom 10, 11 is a tube 13 through which the upper space 14 in the percolator communicates with the lower space 15 in the double bottom. The tube extends almost up to the top of the vessel 1 so that the upper aperture of the tube will in any case lie above the level of the boiling water. The tube 13 extends both through the double strainer bottom 10, 11 and the filter leaf 12. It connects the space above the filter 12 to the space below the filter, and also to the space of the lower vessel 6 directly the valve 3 is opened.

The ground coffee 16 is poured as usual into the vessel, i.e. onto the strainer bottom 10. When boiling water is poured into the vessel 1, the lever should be about an inch below the top end of the tube 13. Any air trapped in the lower space 15 can escape through the tube 13 upwardly into the upper space 14, as indicated by arrow A in Fig. 2. Without this tube 13, an escape would not well be possible, as the ground coffee and the filter leaf 12 bulging into the holes of the strainer bottom 10, 11 have a sealing effect. The steam present in the upper space 14 then streams in opposite direction through the tube 13 into the lower space 15, as indicated by arrow B in Fig. 2. From the lower space 15, the steam flows toward the strainer bottom 10, 11 and the filter leaf 12 to the ground coffee 16, and has a softening action on the latter. After a certain time, the drain valve 3 is opened in known manner by turning the lever 4, thus permitting the boiling water 17 to flow off rapidly in the direction indicated by arrow C. The preliminary action exerted by steam on the ground coffee from the lower space 15 permits rapid draining, thus helping create an excellent flavor. Without the preliminary action of steam, the draining of the boiling water 17 would proceed at a slower rate and any air cushions present in the lower space 15 would, by their resting against and partial sealing of the holes in the strainer bottom 10, 11, also interfere with the smooth and rapid flow through the ground coffee 16, the strainer bottom 10, 11 and the filter leaf 12.

In Fig. 3, 1 again denotes the vessel designed to receive the ground coffee and in the bottom 2 of which a known valve 3 operatable by means of handle 4 and intended for the passage of the coffee filtrate is fitted. The bottom of the vessel is provided with a stepped ring 5 by means of which the vessel 1 can be fitted onto a vessel designed to receive the coffee filtrate. Two flat strainer plates 11a, 11b with an interlaid filter 12 are so placed on the concave strainer bottom 2 as to be easily removable. The two strainer plates 11a, 11b prevent any deformation of the filter. The lower strainer plate carries a central pressure-equalizing tube 13 connecting the vessel space 15 below the filter 12 to the vessel space 14 above the boiling-water level. A finely perforated strainer bottom 10 dished upwardly prevents the introduced ground coffee from coming in contact with the filter 12. The hollow 17 formed between the strainer bottom 10 and the filter is connected to the vessel space 14 above the boiling-water level by means of another pressure-equalizing tube 13a secured to the strainer bottom 10 and extending coaxially to the pressure-equalizing tube 13 and enveloping the latter with a space in between.

The air present in the space 15 and obstructing the circulation of the boiling water through the ground coffee during the boiling of the ground coffee, can escape through the pressure-equalizing tube 13, while the air in the space 17 can leak off through the pressure-equalizing tube 13a.

In Fig. 4, the filter 12 is inserted between a lower flat strainer plate 11b and an upper strainer plate 11a having an upward, annular bulge between the rim and the middle portion. The passage of the boiling water is promoted by the filter being able to curve upwards.

While the invention has been described in detail with respect to a now preferred example and embodiment of the invention it will be understood by those skilled in the art after understanding the invention, that various changes and modifications may be made without departing from the spirit and scope of the invention and it is intended, therefore to cover all such changes and modifications in the appended claim.

Having thus described my invention, I claim as new and desire to secure by Letters Patent:

A percolator for coffee makers comprising a vessel including a transverse bottom, drain valve means in said bottom, a strainer bottom comprising a pair of overlying perforate plates and an intermediate filter disk overlying said vessel bottom and defining a space immediately thereabove and overlying said drain valve means, a tube secured normal to said strainer bottom and communicating with said space and terminating a substantial distance thereabove whereby when ground coffee is disposed on top of said strainer bottom and boiling water is poured into said vessel below the upper end of said tube, air trapped in said space will be relieved through said tube and steam will enter said space to soften said ground coffee from beneath the same prior to opening of said drain valve means and ultimate draining off of the coffee beverage through said strainer bottom from above the same and into said space and out of said drain valve means, a perforated strainer plate overlying said strainer bottom, and a second tube coaxial to said first tube and surrounding the same, said second tube being secured to said strainer plate and defining with said first tube an axial passage therebetween venting the space between said strainer plate and said strainer bottom.

References Cited in the file of this patent

UNITED STATES PATENTS

| | | |
|---|---|---|
| 25,890 | Fay | Oct. 25, 1859 |
| 512,675 | Appleberg | Jan. 16, 1894 |
| 748,910 | Acker | Jan. 5, 1904 |
| 1,501,165 | Erzig | July 15, 1924 |
| 1,613,483 | Richheimer | Jan. 4, 1927 |
| 1,665,199 | Bachelder | Apr. 10, 1928 |
| 2,047,134 | Coleman | July 7, 1936 |
| 2,240,721 | Selitzky | May 6, 1941 |
| 2,256,717 | Kors | Sept. 23, 1941 |
| 2,285,930 | Kahan | June 9, 1942 |